United States Patent [19]
Omodei-Sale

[11] 3,862,954
[45] Jan. 28, 1975

[54] 1,3,5-SUBSTITUTED-1,2,4-TRIAZOLES AND THEIR PREPARATION

[75] Inventor: Amedeo Omodei-Sale, Voghera, Italy

[73] Assignee: Gruppo Lepetit S.P.A., Milan, Italy

[22] Filed: Dec. 6, 1973

[21] Appl. No.: 422,376

[30] Foreign Application Priority Data
Dec. 22, 1972 Italy.................................. 33456/72

[52] U.S. Cl.............. 260/296 R, 424/263, 424/369, 260/244 R, 260/308 R
[51] Int. Cl....................... C07d 31/42, C07d 55/02
[58] Field of Search..................... 260/296 R, 308 R

[56] References Cited
FOREIGN PATENTS OR APPLICATIONS
1,225,612 3/1971 Great Britain ................. 260/244 R
2,147,882 3/1972 Germany....................... 260/296 R OTHER PUBLICATIONS
Eilingsfeld Chem. Ber. Vol. 98, pages 1308 to 1321 (1965) Chemical Abstracts, Vol. 62, cols. 16232 to 16233 (1965).

*Primary Examiner*—John D. Randolph
*Attorney, Agent, or Firm*—Theodore Post; C. Kenneth Bjork

[57] ABSTRACT

A pharmacologically-active triazole represented by the formula

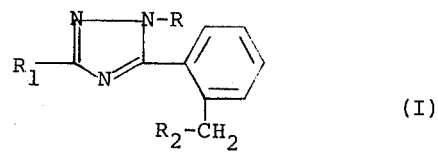

(I)

wherein R is lower alkyl, $R_1$ is pyridyl, lower alkyl-substituted pyridyl, thienyl, lower alkyl-substituted thienyl, furyl, lower alkyl-substituted furyl, indolyl, pyrrolyl or lower alkyl-substituted pyrrolyl; $R_2$ is hydrogen or hydroxy; and a salt thereof with a pharmaceutically acceptable acid. The compounds of the foregoing class have depressant activity on the central nervous system coupled with a low toxicity.

12 Claims, No Drawings

1,3,5-SUBSTITUTED-1,2,4-TRIAZOLES AND THEIR PREPARATION

SUMMARY OF THE INVENTION

This invention relates to new pharmacologically active compounds represented by the formula

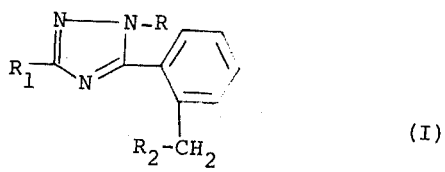

wherein R is lower alkyl, $R_1$ is selected from the group consisting of a pyridyl, a thienyl, a furyl, indolyl or a pyrrolyl radical; $R_2$ is hydrogen or hydroxy; and a salt thereof with a pharmaceutically acceptable acid. In the specification and claims, the term "lower alkyl," designates an alkyl radical of 1 to 4 carbon atoms, e.g., methyl, ethyl, propyl or butyl; "a pyridyl" designates pyridyl or pyridyl having lower alkyl substitution; "a thienyl" designates thienyl or thienyl having lower alkyl substitution; "a furyl" designates furyl or furyl having lower alkyl substitution; "a pyrrolyl" designates pyrrolyl or pyrrolyl having lower alkyl substitution; and "a pharmaceutically acceptable acid" designates an acid, the anions of which are relatively innocuous to mammals at dosages consistent with good biological activity of the 1,2,4-triazole salts thereof. The compounds of the foregoing class have depressant activity on the central nervous system (CNS) coupled with low toxicity.

DESCRIPTION OF THE PREFERRED EMBODIMENTS

A general method for preparing the inventive compounds involves the rearrangement of a hydrazone of 4-hydrazino-1H-2,3-benzoxazine of formula (II) according to the following scheme;

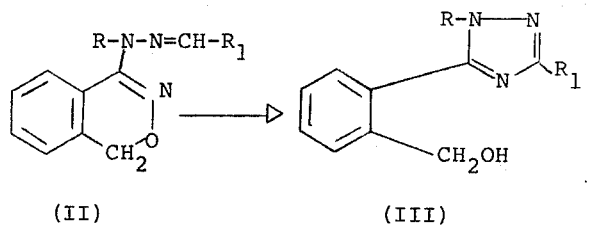

wherein R and $R_1$ have the same meaning as given before. In the rearrangement of the hydrazone, the latter is heated in the presence of an organic solvent, advantageously selected from the lower alkanols and benzene, and in the presence of a strong acid catalyst, advantageously dry hydrogen chloride, p-toluenesulfonic acid, trichloroacetic acid, trifluoroacetic acid and the like. The reaction mixture is generally refluxed for about 1.5 to 5 hours and the final products are then easily isolated by filtration or by evaporation of the solvent.

Further chemical reactions of the above-obtained compounds are possible. In particular, the o-hydroxymethyl group in the ortho position on the phenyl ring is transformed by a chemical procedure, such as catalytic hydrogenation, into a methyl group. Suitable catalysts are metals of the platinum group, their oxides and their sulfides.

The starting hydrazones are prepared by reacting 4-hydrazino-1H-2,3-benzoxazine with a heterocyclic aldehyde of the formula $OCH-R_1$ wherein $R_1$ has the same meaning as given before, pursuant to the procedure described in British Pat. No. 1,227,490.

The salts of the compounds of formula (I) with a pharmaceutically acceptable acid are obtained by adding a suitable acid such as hydrogen chloride to the free base.

The following additional description and examples further describe the invention and the manner and process of making and using it to enable the art skilled to make and use the same and set forth the best mode contemplated by the inventors of carrying out the invention.

Example 1:
5-(o-Hydroxymethylphenyl)-1-methyl-3-(3-pyridyl)-1H-1,2,4-triazole A mixture of 26.5 g. of 4-[1-methyl-2-(3-pyridylmethylene)-hydrazino]-1H-2,3-benzoxazine (m.p. 114°–115°C.) in 265 ml. of ethanol and 265 ml. of 5% HCl is refluxed for 3 hours. Ethanol is removed by distillation and the residue is neutralized with a solution of $Na_2Co_3$ and extracted with dichloromethane four times. The organic phase is evaporated after drying and the titular product residue is crystallized from isopropyl ether. Yield 17.75 g. (67%) M.p. 91°–92°C.

Example 2:
5-(o-Hydroxymethylphenyl)-1-methyl-3-(6-methyl-2-pyridyl)-1H-1,2,4-triazole A mixture of 22.8 g. of 4-[1-methyl-2-(6-methyl-2-pyridylmethylene)-hydrazino]-1H-2,3-benzoxazine (m.p. 127°–128°C.) and 39.7 g. of trichloroacetic in 400 ml. of benzene is refluxed for 4 hours. After evaporation of the solvent, the residue is brought to pH 11 by adding aqueous 10% NaOH solution. The mixture is concentrated to a small volume and extracted with dichloromethane. The organic solution is evaporated and the titular product residue is crystallized from ethyl acetate. Yield 15 g. M.P. 139°–140°C.

Example 3:
5-(o-Hydroxymethylphenyl)-1-methyl-3-(4-pyridyl)-1H-1,2,4-triazole Pursuant to the procedure described in the previous example but using trifluoroacetic acid as the catalyst instead of trichloroacetic acid and 4-[1-methyl-2-(4-pyridylmethylene)-hydrazino]-1H-2,3-benzoxazine (m.p. 166°–167°C.) as the starting material, the titular compound is obtained in a 73% yield. M.p. 136°–137°C.

Example 4:
5-(o-Hydroxymethylphenyl)-1-methyl-3-(2-pyridyl)-1H-1,2,4-triazole Pursuant to the procedure of Example 2 but using p-toluenesulfonic acid as the catalyst instead of trichloroacetic acid and 4-[1-methyl-2-(2-pyridylmethylene)-hydrazino]-1H-2,3-benzoxazine (m.p. 113°–114°C.) as the starting material, the titular compound is obtained in a 35% yield. M.p. 116°–118°C.

Examples 5–11

Pursuant to the procedure of Example 2, but using the benzoxazine of the following Table A as the starting material, the indicated triazole B is obtained.

Table A

| Example No. | Compound A -1H-2,3-benzoxazine | M.P.°C. | Compound B 1H-1,2,4-triazole | M.P. °C. |
| --- | --- | --- | --- | --- |
| 5 | 4-(1-methyl-2-furfur-ylidene-hydrazine)- | 93–95 | 5-(o-Hydroxymethylphenyl-1-methyl-3-(2--furyl)- | 115–117 |
| 6 | 4-[1-methyl-2-(2-pyr-rolylmethylene)hydra-zino]- | 149–151 | 5-(o-Hydroxymethyl-phenyl)-1-methyl-3--(2-pyrrolyl)- | 148–150 |
| 7 | 4-[1-methyl-2-(1--methyl-2-pyrrolyl-methylene)-hydrazino]- | 114–115 | 5-(o-Hydroxymethyl-phenyl)-1-methyl-3--(1-methyl-2-pyrrolyl)- | 149–150 |
| 8 | 4-[1-methyl-2-(3-indo-lylmethylene)-hydra-zino]- | 229 (dec) | 5-(o-Hydroxymethyl-phenyl)-1-methyl-3--(3-indolyl)- | 214–215 |
| 9 | 4-[1-methyl-2-(5--methyl-furfurylidene)--hydrazino]- | 106–108 | 5-(o-Hydroxymethyl-phenyl)-1-methyl-3-(5--methyl-2-furyl)- | 124–126 |
| 10 | 4-[1-methyl-2-(thenyl-idene)-hydrazino]- | 124–126 | 5-(o-Hydroxymethyl-phenyl)-1-methyl-3--(2-thenyl)- | 111–112 |
| 11 | 4-[1-methyl-2-(5-methyl--2-thenylidene)-hydra-zino]- | 137–138 | 5-(o-Hydroxymethyl-phenyl)-1-methyl--3-(5-methyl-2-thenyl)- | 90–92 |

Example 12:

1-Methyl-3-(3-pyridyl)-5-(o-tolyl)-1H-1,2,4-triazole

In 180 ml. of acetic acid, 8 g. of 5-(o-hydroxymethylphenyl)-1-methyl-3-(3-pyridyl)-1H-1,2,4-triazole is dissolved and 9.75 ml. of 60% perchloric acid and 1.5 g. of 10% palladiated charcoal are added to the solution. The mixture is kept under hydrogen atmosphere for about eight hours during which about 900 ml. of $H_2$ is absorbed. The catalyst is then removed by filtration and the solution is evaporated to dryness. The residue is dissolved in 100 ml. of water and brought to pH 9 with about 125 ml. of a saturated aqueous solution of $Na_2CO_3$. The oil which separates is extracted several times with ethyl ether and the resulting organic solution is washed with $H_2O$ and dried over $Na_2SO_4$. Evaporation yields the solid titular product melting at 89°–90°C. after crystallization from hexane. Yield 5.9 g. (79%).

Examples 13–20

By catalytically hydrogenating the corresponding o-hydroxymethyl derivatives pursuant to the procedure of Example 12, the following triazoles are obtained:

13. 1-Methyl-3-(6-methyl-2-pyridyl)-5-(o-tolyl)-1H-1,2,4-triazole. M.p. 119°–120°C. Yield 78%.
14. 1-Methyl-3-(4-pyridyl)-5-(o-tolyl)-1H-1,2,4-triazole. M.p. 108°–110°C. Yield 73%.
15. 1-Methyl-3-(5-methyl-2-furyl)-5-(o-tolyl)-1H-1,2,4-triazole. M.p. 132°–133°C. Yield 80%.
16. 1-Methyl-3-(1-methyl-2-pyrrolyl)-5-(o-tolyl)-1H-1,2,4-triazole. M.p. 78°–80°C. Yield 82%.
17. 1-Methyl-3-(2-furyl)-5-(o-tolyl)-1H-1,2,4-triazole. B.p. 160/0.01 mm Hg. Yield 83%
18. 1-Methyl-3-(2-thienyl)-5-(o-tolyl)-1H-1,2,4-triazole. M.p. 71°–72°C. Yield 46%.
19. 1-Methyl-3-(5-methyl-2-thienyl)-5-(o-tolyl)-1H-1,2,4-triazole. M.p. 74-75°C. Yield 59%.
20. 1-Methyl-3-(3-indolyl)-5-(o-tolyl)-1H-1,2,4-triazole hydrochloride. M.p. 220°–225°C. Yield 70%.

By starting with a hydrazone of formula (II) wherein R is an ethyl, propyl or butyl radical, the corresponding inventive compounds are similarly prepared.

The compounds of the present invention have CNS depressant activity. In particular, they have hypnotic properties which are not bound to barbiturate-like effects.

Experiments carried out on mice with representative compounds showed that amounts from about 10 to about 100 mg/kg i.p. are effective in decreasing the spontaneous activity in the animals. Other experiments showed that quantities from about 10 to about 120 mg/kg i.p. of representative compounds induce a substantial impairment of motor coordination and righting reflex. Moreover, it was found that in some cases doses of about 50 to about 300 mg/kg i.p. of representative inventive compounds produce a complete loss of the righting reflex in the animals.

Experiments carried out in dogs and in cats showed that the new compounds are similarly active in these animals also at oral doses ranging between 25 and 120 mg/kg.

The toxicity of the compounds is very low since the $LD_{50}$ in mice is generally higher than 500 mg/kg i.p.

The following table reports the pharmacological effects of representative members of the new class of compounds.

| Compound of Example | Minimal Hypnotic Dose in Mice mg/kg i.p. | $LD_{50}$ in mice mg/kg i.p. | Dose which produces paralysis and hypnosis in cats, mg/kg i.p. |
| --- | --- | --- | --- |
| 1 | 200 | 600 | 50 |
| 2 | 80 | 500 | 40 |
| 4 | 200 | 500 | 100 |
| 5 | 50 | 450 | 40 |
| 6 | 100 | 500 | 60 |
| 7 | 100 | 600 | 100 |
| 8 | 200 | 500 | 80 |
| 9 | 30 | 450 | 40 |
| 10 | 100 | 600 | 100 |
| 11 | 150 | 500 | 50 |
| 13 | 30 | 450 | 20 |
| 15 | 30 | 800 | 100 |
| 16 | 50 | 500 | 50 |
| 17 | 20 | 400 | 40 |
| 18 | 100 | 600 | 100 |
| 19 | 200 | 600 | 100 |
| Glutethimide | 300 | 400 | 100 |

The standard or control compound, glutethimide, 3-ethyl-3-phenyl-piperidine-2,6-dione, is a well-known non-barbiturate sedative and hypnotic agent widely used in chemotherapeutic practice.

The preferred routes of administration of these compounds are by mouth or parenterally; however, other routes may be usefully employed. In oral dosage compositions, the compounds are embodied in pharmaceutical dosage forms such as tablets, capsules, elixirs, solutions and the like. The dosage unit may contain usual excipients such as, for example, starch, gums, alcohols, sugars, fatty acids, etc.

For parenteral administration, the compounds are administered in the form of aqueous parenteral solutions mixed with common antioxidants, preservatives, chelating and buffering agents such as sodium formaldehyde sulfoxylate, benzyl alcohol, ethylenediaminotetracetic acid derivatives, sodium acetate and others.

The daily dosage range is from about 0.5 to about 20 mg. per kg. of body weight, preferably administered in divided doses.

What is claimed is:

1. A compound of the formula

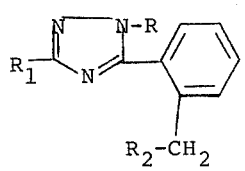

wherein R is lower alkyl; $R_1$ is selected from the group consisting of a pyridyl, a thienyl, a furyl, indolyl or a pyrrolyl radical; $R_2$ is hydrogen or hydroxyl; and a salt thereof with a pharmaceutically acceptable acid.

2. A compound of claim 1 which is 5-(o-hydroxymethylphenyl)-1-methyl-3-(3-pyridyl)-1H-1,2,4-triazole.

3. A compound of claim 1 which is 5-(o-hydroxymethylphenyl)-1-methyl-3-(6-methyl-2-pyridyl)-1H-1,2,4-triazole.

4. A compound of claim 1 which is 5-(o-hydroxymethylphenyl)-1-methyl-3-(2-furyl)-1H-1,2,4-triazole.

5. A compound of claim 1 which is 5-(o-hydroxymethylphenyl)-1-methyl-3-(5-methyl-2-furyl)-1H-1,2,4-triazole.

6. A compound of claim 1 which is 1-methyl-3-(6-methyl-2-pyridyl-5-(o-tolyl)-1H-1,2,4-triazole.

7. A compound of claim 1 which is 1-methyl-3-(5-methyl-2-furyl)-5-(o-tolyl)-1H-1,2,4-triazole.

8. A compound of claim 1 which is 1-methyl-3-(1-methyl-2-pyrrolyl)-5-(o-tolyl)-1H-1,2,4-triazole.

9. A compound of claim 1 which is 1-methyl-3-(2-furyl)-5-(o-tolyl)-1H-1,2,4-triazole.

10. A process for preparing a compound of the formula

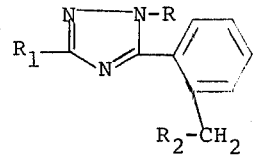

wherein R is lower alkyl; $R_1$ is selected from the group consisting of a pyridyl, a thienyl, a furyl, indolyl or a pyrrolyl radical; $R_2$ is hydrogen or hydroxyl; and a salt thereof with a pharmaceutically-acceptable acid; which comprises heating at reflux in the presence of an organic solvent and an acid catalyst a 4-hydrazino-1H-2,3-benzoxazine of the formula

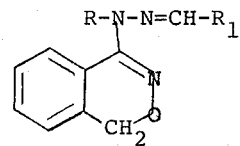

wherein R and $R_1$ have the meaning previously given whereby the said benzoxazine is rearranged to give the said product and, where $R_2$ is hydroxyl, catalytically hydrogenating the hydroxymethyl radical, if desired, to the methyl radical.

11. A process as claimed in claim 10 which comprises submitting to the said acid-catalyzed rearrangement the said 4-hydrazino-1H-2,3-benzoxazine.

12. A process as claimed in claim 10 which comprises catalytically hydrogenating the hydroxymethyl radical to the methyl radical.

* * * * *